(12) United States Patent
Sekiyama

(10) Patent No.: US 10,760,920 B2
(45) Date of Patent: Sep. 1, 2020

(54) MAP INFORMATION PROCESSING DEVICE AND MAP INFORMATION PROCESSING METHOD

(71) Applicants: MICWARE CO., LTD., Kobe-shi, Hyogo (JP); iMics.inc., Tokyo (JP)

(72) Inventor: Hiroaki Sekiyama, Kobe (JP)

(73) Assignees: MICWARE CO., LTD., Kobe-Shi, Hyogo (JP); IMICS. INC., Tokyo (JP)

( * ) Notice: Subject to any disclaimer, the term of this patent is extended or adjusted under 35 U.S.C. 154(b) by 0 days.

(21) Appl. No.: 16/688,891

(22) Filed: Nov. 19, 2019

(65) Prior Publication Data

US 2020/0088538 A1 Mar. 19, 2020

Related U.S. Application Data

(63) Continuation of application No. PCT/JP2018/043027, filed on Nov. 21, 2018.

(30) Foreign Application Priority Data

Nov. 22, 2017 (JP) .................................. 2017-224128
Oct. 25, 2018 (JP) .................................. 2018-201337

(51) Int. Cl.
*G01C 21/36* (2006.01)
*G06T 7/00* (2017.01)
(Continued)

(52) U.S. Cl.
CPC ............ *G01C 21/3602* (2013.01); *G06T 7/20* (2013.01); *G06T 7/97* (2017.01); *G06T 11/203* (2013.01);
(Continued)

(58) Field of Classification Search
None
See application file for complete search history.

(56) References Cited

U.S. PATENT DOCUMENTS 8,390,686 B2 * 3/2013 Tanaka ............. G08B 13/19602
348/159
9,285,227 B1 * 3/2016 Chao ...................... G01C 21/32
(Continued)

FOREIGN PATENT DOCUMENTS

JP 9-243391 A 9/1997
JP 2004-109021 A 4/2004
(Continued)

OTHER PUBLICATIONS

International Search Report for PCT/JP2018/043027 (PCT/ISA/210) dated Feb. 19, 2019.
(Continued)

*Primary Examiner* — David H Chu
(74) *Attorney, Agent, or Firm* — Birch, Stewart, Kolasch & Birch, LLP

(57) ABSTRACT

The map information processing device includes a processor. The processor that extracts difference data by comparing a movement track image based on individual movement tracks of a plurality of moving bodies with an image in a scalar form based on vector data that is different from the movement track image; and The processor that decides through machine learning whether the difference data corresponds to a road shape change.

14 Claims, 25 Drawing Sheets

(51) Int. Cl.
*G06T 7/20* (2017.01)
*G06T 11/20* (2006.01)

(52) U.S. Cl.
CPC ............... *G06T 2207/20081* (2013.01); *G06T 2207/30241* (2013.01); *G06T 2207/30256* (2013.01)

(56) References Cited

U.S. PATENT DOCUMENTS

| | | | | |
|---|---|---|---|---|
| 10,222,228 | B1* | 3/2019 | Chan | G01C 21/3697 |
| 2003/0164779 | A1* | 9/2003 | Gieseke | G08G 1/0968 |
| | | | | 340/993 |
| 2004/0122590 | A1* | 6/2004 | Ito | G01C 21/30 |
| | | | | 701/446 |
| 2005/0228584 | A1* | 10/2005 | Adachi | G06Q 10/047 |
| | | | | 701/448 |
| 2007/0032946 | A1* | 2/2007 | Goto | G01C 21/32 |
| | | | | 701/93 |
| 2008/0162041 | A1* | 7/2008 | Nakamura | G01C 21/32 |
| | | | | 701/533 |
| 2011/0115920 | A1* | 5/2011 | Wang | G06K 9/00778 |
| | | | | 348/169 |
| 2011/0276592 | A1* | 11/2011 | Gautama | G01C 21/32 |
| | | | | 707/769 |
| 2012/0277993 | A1* | 11/2012 | Mund | G09B 29/106 |
| | | | | 701/450 |
| 2014/0340419 | A1* | 11/2014 | Otero | G06T 9/00 |
| | | | | 345/619 |
| 2015/0220776 | A1* | 8/2015 | Cronholm | G06T 7/248 |
| | | | | 382/103 |
| 2015/0308841 | A1 | 10/2015 | Matsunaga et al. | |
| 2016/0282127 | A1* | 9/2016 | Goto | G01C 21/30 |
| 2017/0144047 | A1* | 5/2017 | Crawford | G16H 20/30 |
| 2018/0089791 | A1* | 3/2018 | Greenwood | G01C 21/32 |
| 2018/0330510 | A1* | 11/2018 | Watanabe | G06T 7/246 |

FOREIGN PATENT DOCUMENTS

| | | |
|---|---|---|
| JP | 2004-198997 A | 7/2004 |
| JP | 2008-164821 A | 7/2008 |
| JP | 2014-52341 A | 3/2014 |
| JP | 2014/126372 A | 7/2014 |
| JP | 2017-97088 A | 6/2017 |

OTHER PUBLICATIONS

Written Opinion of the International Searching Authority for PCT/JP2018/043027 (PCT/ISA/237) dated Feb. 19, 2019.

* cited by examiner

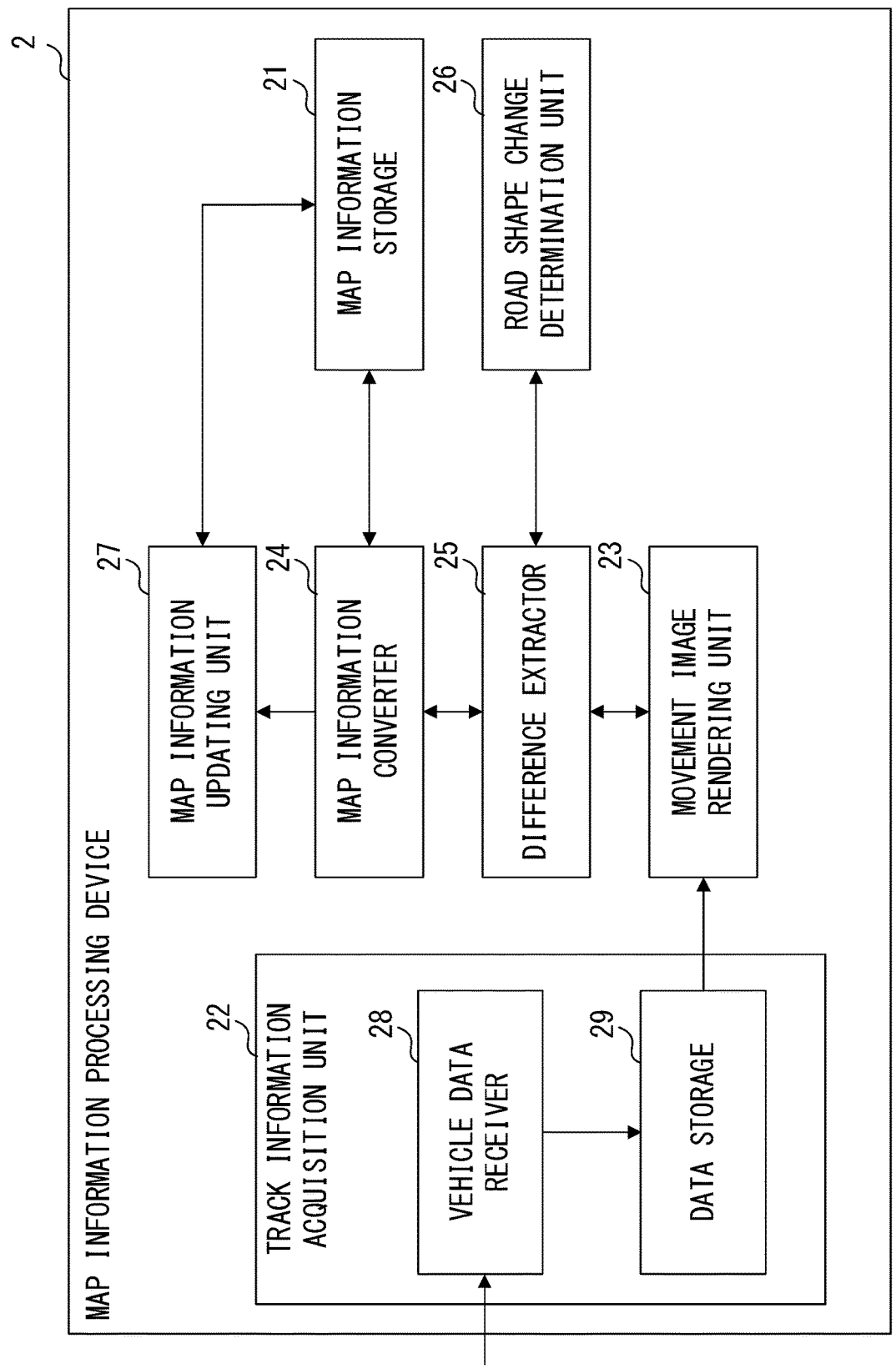
F I G. 3

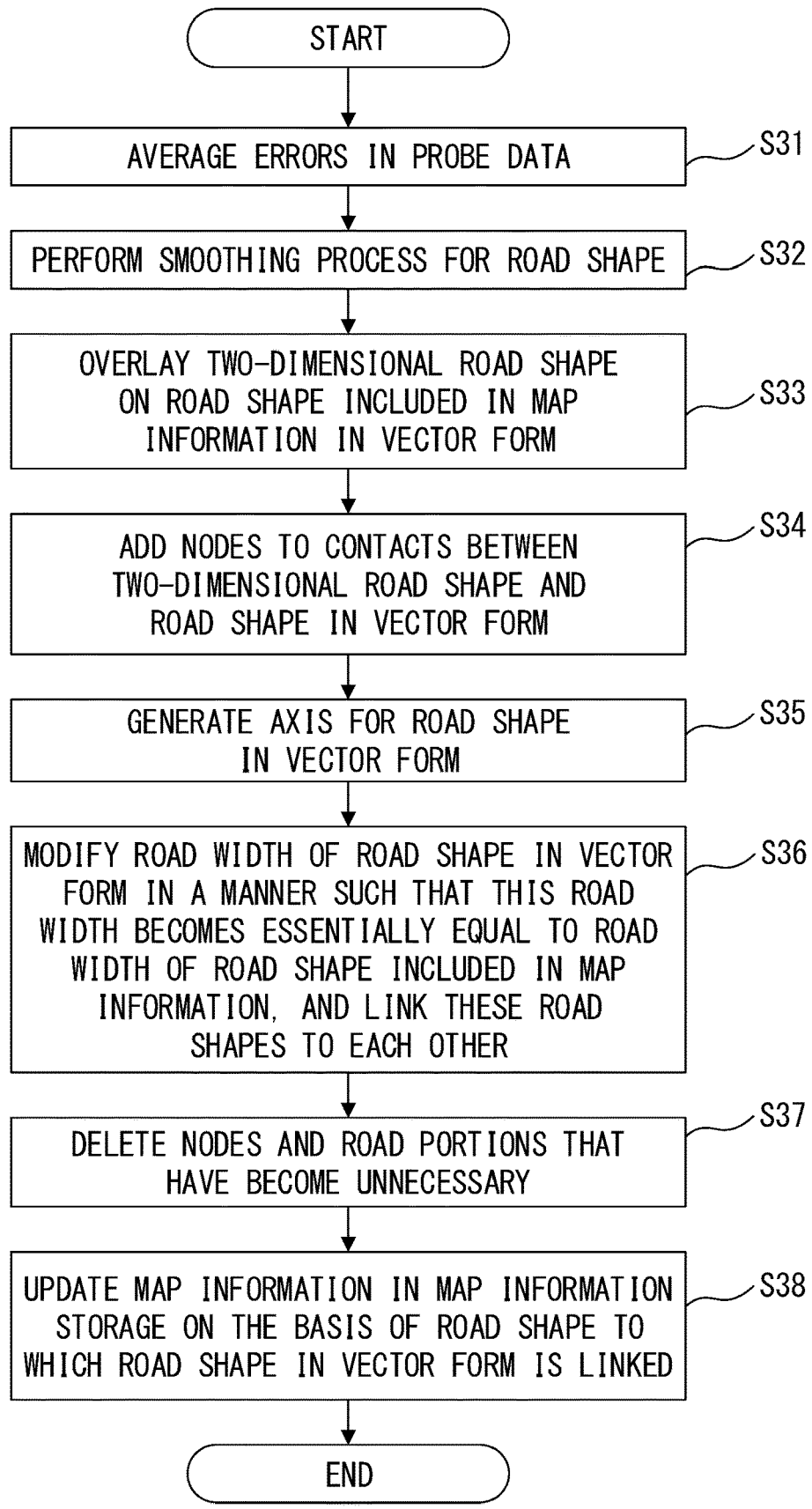
F I G. 9

F1

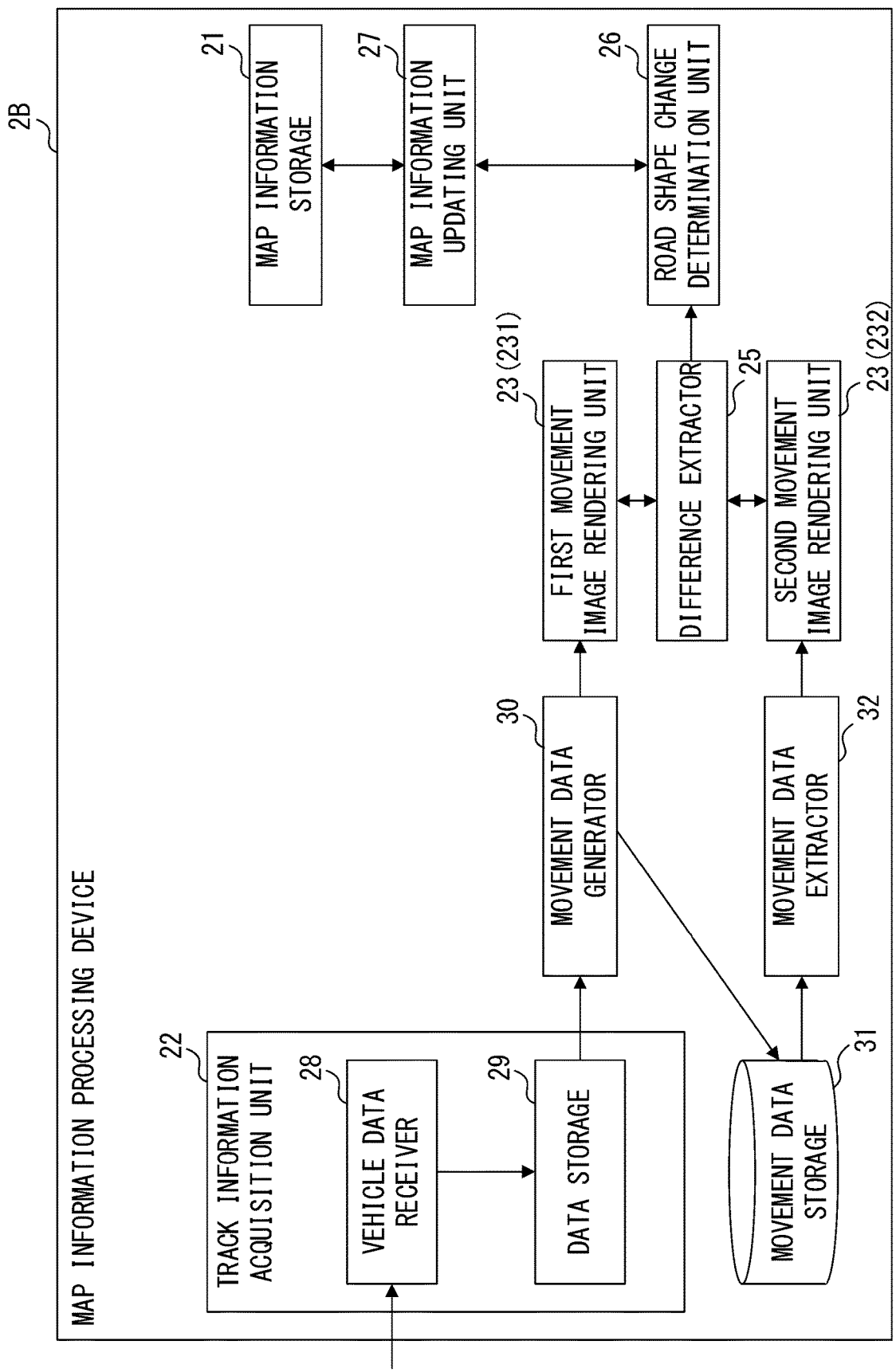
F I G. 11

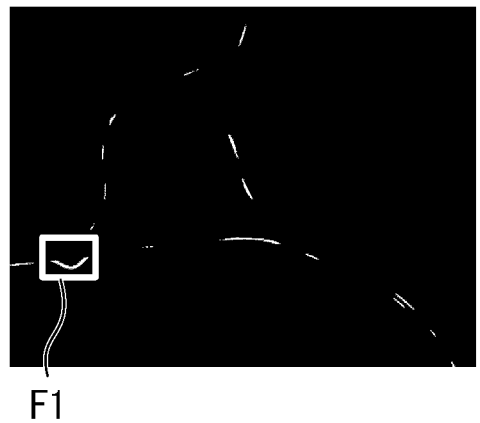
F I G. 1 2 A

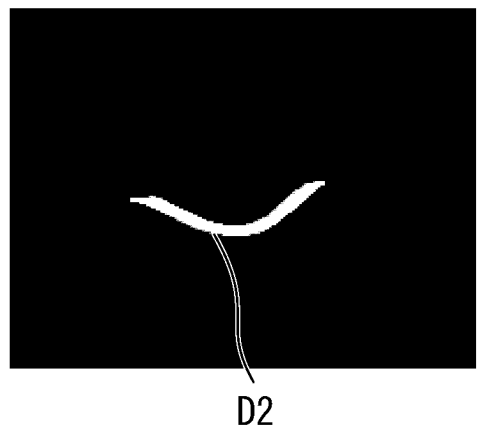
F I G. 1 2 B

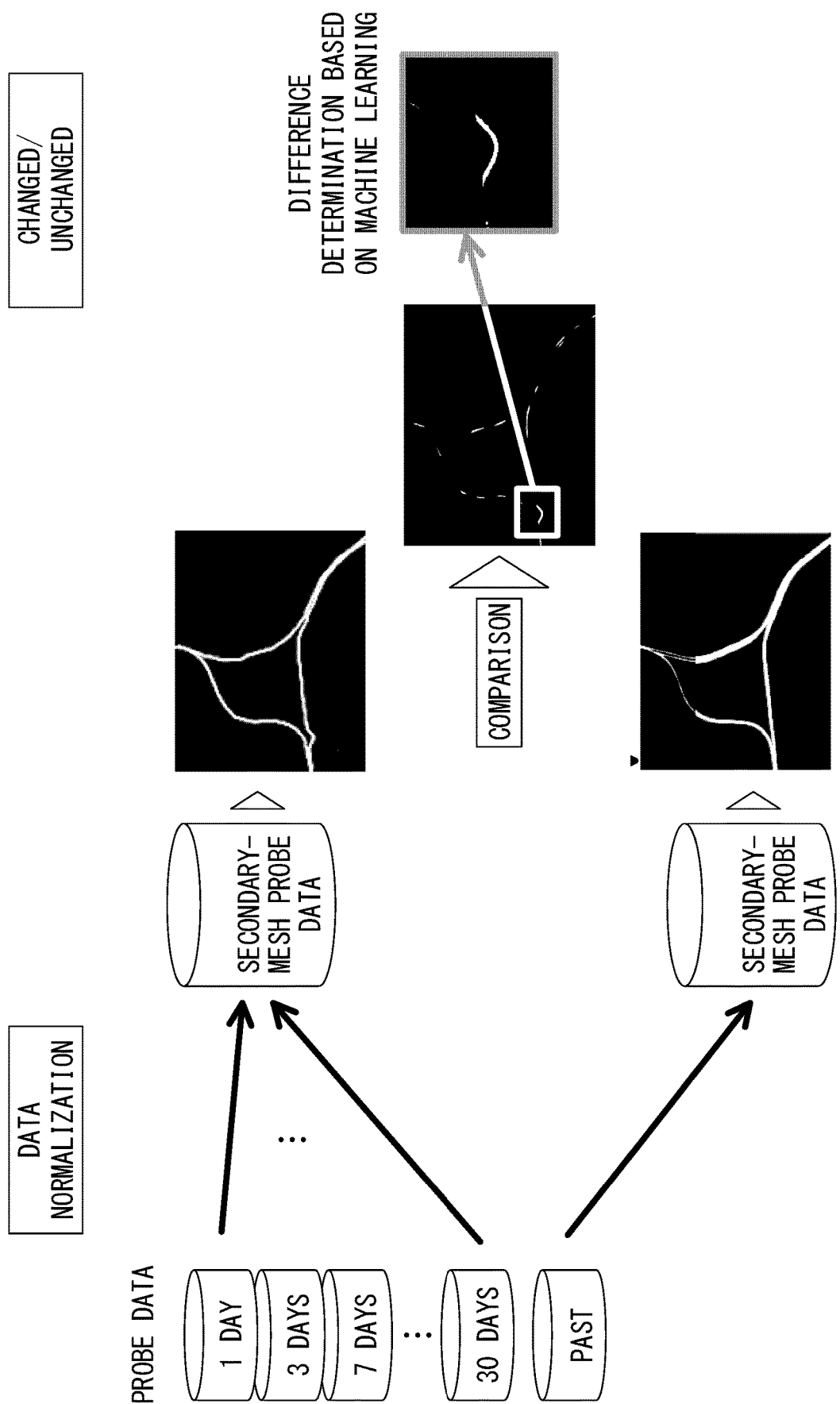
F I G. 14

MAP INFORMATION PROCESSING DEVICE AND MAP INFORMATION PROCESSING METHOD

CROSS-REFERENCE TO RELATED APPLICATIONS

This application is a continuation application of International Application No. PCT/JP2018/043027, filed on Nov. 21, 2018, which claims the benefit of priority of the prior Japanese Patent Application No. 2017-224128, filed on Nov. 22, 2017, and Japanese Patent Application No. 2018-201337, filed on Oct. 25, 2018, the entire contents of which are incorporated herein by reference.

TECHNICAL FIELD

The present invention relates to a map information processing device, a map information processing method, and a map information processing program for deciding in accordance with track information of a plurality of moving bodies whether a road shape in map information has changed.

BACKGROUND ART

At present, road information is managed in units of administrable districts such as countries, prefectures, cities, or wards, and pieces of information on changes in road shapes (such changes may hereinafter be referred to as "road shape changes") are not unified. Grasping road shape changes so as to create a road map involves determining the positions and shapes of new roads.

One possible method may involve updating a road map by determining how a road shape has been changed on the basis of, for example, a digital map issued by the Geographical Survey Institute of Japan and probe data (track information) acquired from vehicle terminals.

A configuration known for a device for generating such a type of map information is one wherein the road connection situation is correctly estimated on the basis of position information acquired by vehicle-installed terminals so as to generate an updated map (e.g., Patent Document 1: Japanese Laid-open Patent Publication No. 2017-97088).

However, road shapes could be complicated and involve various patterns, e.g., a crossroad being changed intoarotary, and hence it may be difficult to generate an updated map simply from map information and position information.

Accordingly, the configuration described in document alone is insufficient, and there is need for further improvement.

SUMMARY

In one aspect of the present invention, a map information processing device of the invention includes a processor. The processor extracts difference data. The difference data indicates the difference between a movement track image based on the individual movement tracks of a plurality of moving bodies and an image in a scalar form that is different from the movement track image and based on vector data. The processor decides through machine learning whether the difference data corresponds to a road shape change.

BRIEF DESCRIPTION OF THE DRAWINGS

FIG. 3 is a functional block diagram illustrating examples of the functions of a map information processing apparatus in accordance with a first embodiment;

FIG. 9 is a flowchart illustrating an example of a map information updating process based on a road shape change determination process program;

FIG. 11 is a functional block diagram illustrating examples of the functions of a map information processing apparatus in accordance with a second embodiment;

FIG. 12A illustrates an example of a method for extracting difference data from a movement track image and a past movement track image by means of a difference extractor in accordance with a second embodiment;

FIG. 12B illustrates an example of a method for extracting difference data from a movement track image and a past movement track image by means of a difference extractor in accordance with a second embodiment;

FIG. 14 illustrates an example of a road shape change determination process in accordance with a second embodiment.

DESCRIPTION OF EMBODIMENTS

First Embodiment

Figure 1:
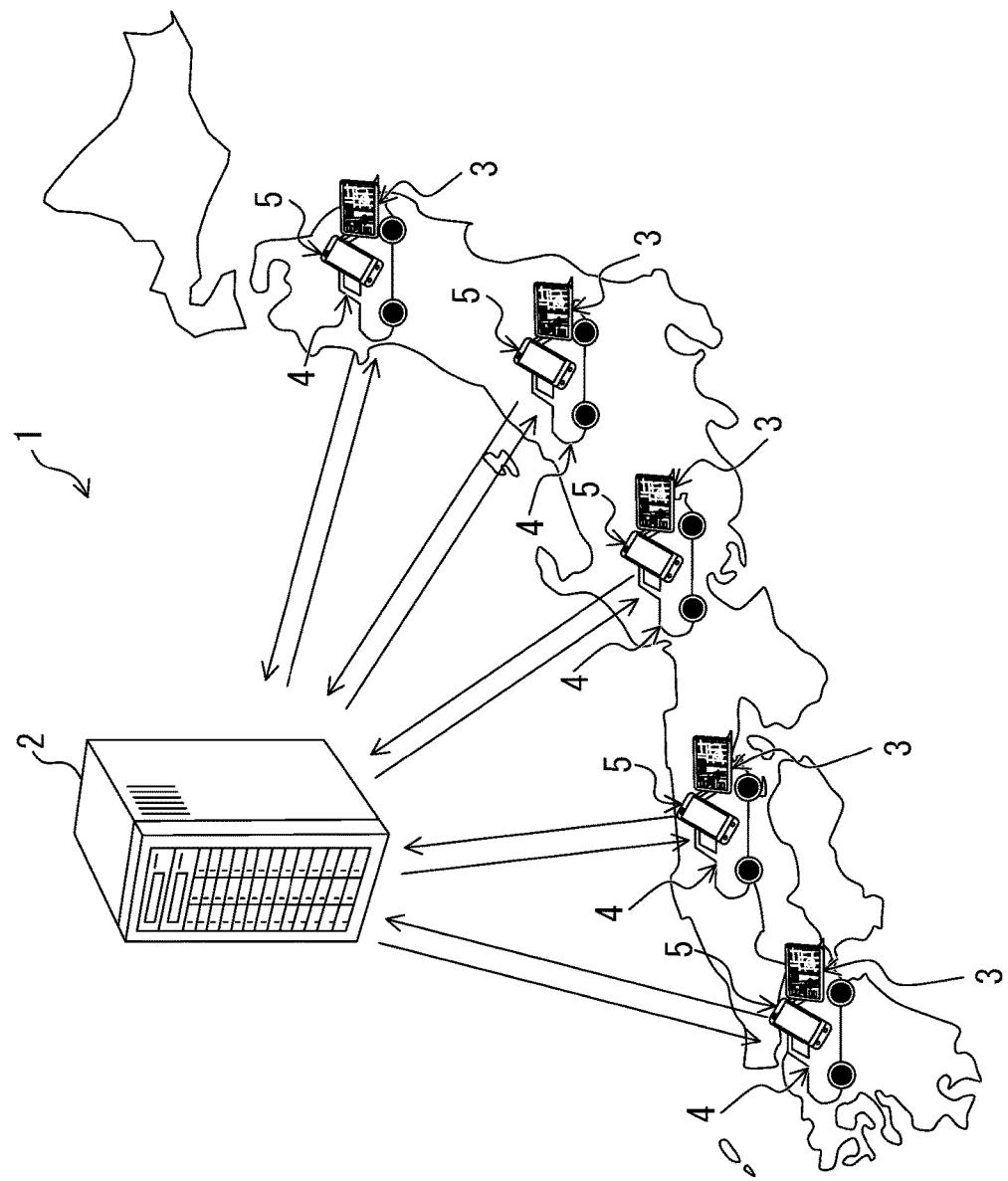
FIG. 1 illustrates an example of a map information processing system in accordance with a first embodiment.

The following describes a map information processing system 1 in accordance with a first embodiment of the present invention by referring to FIG. 1. The map information processing system 1 in accordance with the first embodiment is used to facilitate the determination of road shape changes in creating a map. As depicted in FIG. 1, the map information processing system 1 includes a map information processing device 2 and a plurality of vehicle-installed terminals 3. Descriptions are given of the components of the map information processing system 1 in accordance with the present embodiment in detail in the following.

The vehicle-installed terminals 3 are installed in vehicles 4 that travel on the road. For example, the vehicle-installed terminals 3 may include car navigation devices. The map information processing device 2 and the vehicle-installed terminals 3 are configured to be capable of being connected to each other via a radio communication. FIG. 1 exemplifies radio communications between vehicles 4 traveling in Japan and the map information processing device 2 by using arrows. In the map information processing system 1, pieces of probe data are transmitted from the vehicle-installed terminals 3 to the map information processing device 2.

For example, probe data may include time information and information on the vehicle position of a vehicle 4 in which a vehicle-installed terminal 3 is installed (this information may hereinafter be referred to as "track information"). In addition to the vehicle position information and the time information, the probe data includes information on the travel history (attribute information) of the vehicle 4, e.g., travel distance, travel speed, acceleration, angular velocity, vehicle orientation, slope angle. For example, the probe data may be created using the vehicle-installed terminal 3 installed in the vehicle 4. The vehicle-installed terminal 3 may acquire various types of sensor information from a global-positioning-system (GPS) module, gyro sensor, and acceleration sensor installed in the vehicle 4. For example, the information on the vehicle position may be calculated using GPS data output from the GPS module of the car navigation device. In particular, the information on the vehicle position is acquired using the function of a satellite positioning system such as the GPS. The information on the vehicle position indicates the position coordinates of the vehicle 4 at a certain time.

Figure 2:
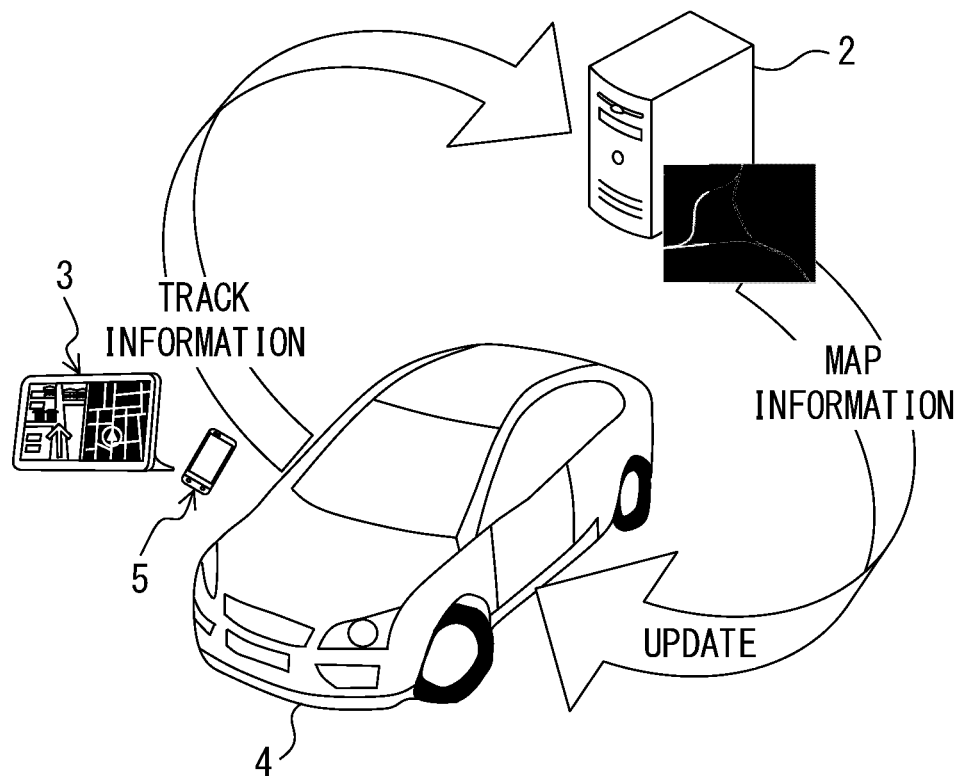
FIG. 2 illustrates an example of a relationship between a map information processing apparatus in accordance with a first embodiment and a vehicle-installed terminal.

As depicted in FIG. 2, the vehicle-installed terminal 3 is configured to be capable of communicating with the map information processing device 2 via a communication terminal 5. The vehicle-installed terminal 3 transmits probe data that includes track information of the vehicle 4 to the map information processing device 2 via the communication terminal 5. The vehicle-installed terminal 3 may be connected to the communication terminal 5 wirelessly or by a wired link. The vehicle-installed terminal 3 may be physically separated from the communication terminal 5 or may have the communication terminal 5 mounted therein, i.e., integrated therewith. For example, the communication terminal 5 may be a communication unit, a portable telephone, or a smartphone. When the communication terminal 5 is a smartphone, the communication terminal 5 is communicably connected to the vehicle-installed terminal 3 in accordance with, for example, a communication standard such as BLUETOOTH® or Wi-Fi. For example, when the communication terminal 5 is a smartphone, the communication terminal 5 may be communicably connected to the map information processing device 2 over a communication network.

The map information processing device 2 receives probe data transmitted from vehicle-installed terminals 3 and acquires track information included in the probe data. On the basis of the track information, the map information processing device 2 decides through machine learning whether a road shape included in map information has changed. Details of this decision will be described hereinafter. When deciding that the road shape has changed, the map information processing device 2 may update the map information.

Although the vehicle-installed terminal 3 in the embodiment described above includes a car navigation device, the invention is not limited to this. The vehicle-installed terminal 3, which is not limited to a car navigation device, may be any type of terminal device. For example, the terminal device may be a portable telephone, a smartphone, a notebook PC, or a tablet PC. In particular, the vehicle-installed terminal 3 may be a single smartphone carried in a vehicle 4. The vehicle 4 in accordance with the present embodiment is exemplified as a four-wheeled car in which a vehicle-installed terminal 3 is installed. The vehicle 4 is not limited to a four-wheeled car and may be a three-wheeled car, a two-wheeled motor vehicle, or a bicycle. In other words, the vehicle 4 is a moving body.

The following describes the map information processing device 2 in accordance with the first embodiment by referring to FIG. 3.

The map information processing device 2 in accordance with the present embodiment includes a map information storage 21, a track information acquisition unit 22, a movement image rendering unit 23, a map information converter 24, a difference extractor 25, a road shape change determination unit 26, and a map information updating unit 27. The map information storage 21 stores map information. The map information storage 21 preferably stores map information for each of a plurality of scaling factors.

The map information is information for forming a map. The map information includes vector data. It will be more preferable that the map information include three-dimensional vector data. The vector data includes information indicating the position and shape of a road. More specifically, the map information includes, for example, map image information Indicating a road shape and the following types of information associated with the map image information: information on nodes or links on a map image and attribute information indicating whether the road is an ordinary road or an expressway. A node indicates, for example, a junction or a nodal cell on road network representation. A link indicates a road section between nodes. Map information is constituted in units of rectangular meshes divided at certain latitudinal and longitudinal intervals. In addition, each mesh includes a plurality of hierarchical levels separated into specified units and having different scaling factors. In Japan, for example, the standardized regional mesh standard set by the Ministry of Internal Affairs and Communications may be used for meshes. The standardized regional meshes include primary, secondary, and tertiary meshes, wherein the area of each primary mesh is about 10 times the area of each secondary mesh, and the area of each secondary mesh is about 10 times the area of each tertiary mesh. Moreover, divisional regional meshes smaller than the primary, secondary, or tertiary meshes may be used as a mesh unit. When map information is divided into meshes, each of the meshes has a mesh number and information on a corresponding latitude and longitude.

The track information acquisition unit 22 includes a vehicle data receiver 28 and a data storage 29. The vehicle data receiver 28 receives probe data transmitted from the vehicle-installed terminal 3 of each of a plurality of vehicles 4. The data storage 29 stores the probe data received by the vehicle data receiver 28. The track information acquisition unit 22 may receive probe data from vehicle-installed terminals 3 so as to acquire track information of the vehicles 4 included in the probe data. Track information is a set of coordinates each acquired at a certain time point and indicated by a latitude and a longitude.

The movement image rendering unit 23 collectively renders movement track images on the basis of track information acquired by the track information acquisition unit 22 for a plurality of vehicles 4 located within a specified range. For example, the specified range may correspond to meshes of an arbitrary scaling factor for forming road information.

Figure 4A:
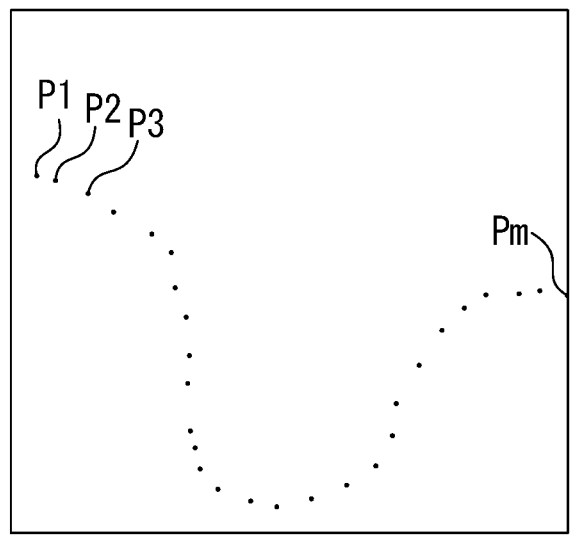
FIG. 4A illustrates an example of a method for rendering a movement track image of a vehicle by means of a movement image rendering unit.
Figure 4B:
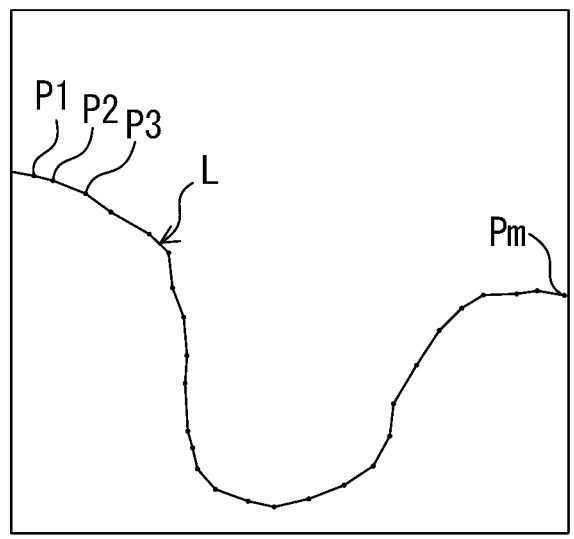
FIG. 4B illustrates an example of a method for rendering a movement track image of a vehicle by means of a movement image rendering unit.

The following describes an example of the process of rendering a movement track image for a vehicle 4 that is performed by the movement image rendering unit 23. As depicted in FIG. 4A, the movement image rendering unit 23 obtains a group of m consecutive pieces of probe data on the basis of the coordinates of track information and information on times, travel speeds, accelerations, angular velocities that are included in a plurality of pieces of probe data received by the vehicle data receiver 28. For example, the movement image rendering unit 23 may obtain, from among the probe data at specified time intervals, probe data groups that have consecutive coordinates as groups of probe data. The movement image rendering unit 23 obtains the coordinates of m pieces of track information included in the group of probe data from the data storage 29. The movement image rendering unit 23 plots the obtained coordinates as points P1, P2, P3 . . . Pm. As depicted in FIG. 4B, the movement image rendering unit 23 links the points P1, P2, P3 . . . Pm with a line and renders this line as a single movement track image L. Accordingly, the movement image rendering unit 23 can generate a movement track image in a scalar form from vector probe data that includes information on times, travel distances, travel speeds, accelerations, and angular velocities in addition to track information.

When the vehicle data receiver 28 receives probe data, the movement image rendering unit 23 may repeatedly render movement track images. When the movement image rendering unit 23 renders a plurality of movement track images in an superimposed manner, the movement image rendering unit 23 may calculate a median value or a root mean square for each of the movement track images and render, as an averaged movement track image, a line linking the widthwise median values (central coordinates) of the movement track images rendered in a superimposed manner. Accordingly, the movement image rendering unit 23 minimizes errors in GPS data that could be caused by multipath propagation and fluctuations in the coordinates of track information that could be caused by a communication disturbance. Owing to the minimization of fluctuations in the coordinates, the movement image rendering unit 23 can have an enhanced rendering accuracy.

By referring to information on travel speeds included in pieces of probe data, the movement image rendering unit 23 may render a movement track image without considering pieces of probe data indicating travel speeds higher than or equal to a specified speed. A travel speed, i.e., vehicle speed, calculated from GPS data by a vehicle-installed terminal 3 could be, for example, 300 km or greater, i.e., a value that would be impossible as a general rule, due to a communication disturbance or an error in the GPS data caused by multipath propagation. The movement image rendering unit 23 can minimize false detection of travel information that could be caused by a communication disturbance or an error in GPS data associated with multipath propagation. Owing to the minimization of false detection of travel information, the movement image rendering unit 23 can have an enhanced rendering accuracy.

By referring to information on travel speeds included in pieces of probe data, the movement image rendering unit 23 may render a movement track image with pieces of probe data that do not have consecutive travel speeds removed. Accordingly, the movement image rendering unit 23 may remove probe data acquired from, for example, the vehicle-installed terminal 3 of a vehicle 4 in a parking lot. The movement image rendering unit 23 can have an enhanced accuracy in rendering a movement track image by ignoring unnecessary probe data.

The movement image rendering unit 23 refers to track information and information on travel speeds that are included in pieces of probe data. The movement image rendering unit 23 may render movement track images with pieces of probe data from which vehicles are estimated to be traveling on expressways being distinguished from pieces of probe data from which vehicles are estimated to be traveling on ordinary roads. Accordingly, the map information processing device 2 may set only an arbitrarily selected road type as a road type for which a road shape change determination process is to be performed. The map information processing device 2 can achieve an enhanced processing speed.

The movement image rendering unit 23 may render a movement track image on the basis of track information of a vehicle 4 that is acquired for a specified unit period. For example, the movement image rendering unit 23 may normalize data on the basis of track information accumulated during a specified unit period. For each mesh unit and for each unit period, the movement image rendering unit 23 may create probe data from normalized data. For example, the specified unit period may be 30 days before the current time. In the present embodiment, the movement image rendering unit 23 creates, for each unit period, secondary-mesh probe data. In this way, the map information processing device 2 can have an enhanced accuracy in rendering a movement track image by creating probe data on the basis of track information accumulated over a specified period.

The movement image rendering unit 23 may accumulate past probe image data to be used as a reference. The movement image rendering unit 23 may create past probe data to be used as a reference, on the basis of track information accumulated in advance over a particular period before secondary-mesh probe data is created on the basis of track information acquired for a specified unit period. Past probe data is preferably created for each mesh. For example, thirty days may be set for the movement image rendering unit 23 as the particular period for past probe data. In the present embodiment, the movement image rendering unit 23 creates, as past probe data, secondary-mesh probe data accumulated for thirty days.

In a first step, the movement image rendering unit 23 may compare newly created secondary-mesh probe data with secondary-mesh probe data created in the past so as to decide whether there is a difference therebetween. Only when there is a difference, the movement image rendering unit 23 compares, in a second step, the new probe data with map information. Accordingly, the map information processing device 2 can detect a road shape change through two stages. The map information processing device 2 sets, as an object for which a difference-data extraction process is to be performed by the difference extractor 25, only probe data for which a difference from past probe data has been detected. Since the map information processing device 2 sets, as an object for which a difference-data extraction process is to be performed, only probe data for which a difference from past probe data has been detected, the number of objects to be processed by the difference extractor 25 can be decreased. The map information processing device 2 can decrease the number of objects to be processed by the difference extractor 25, thereby reducing the processing load while enhancing the processing speed.

Although the specified unit period in the embodiment described above is 1 day, 3 days, 7 days, or 30 days, the invention is not limited to this. The specified unit period may be not only a period expressed on a daily basis but also any period expressed on, for example, an hourly, monthly, or yearly basis. Although the particular period in the embodiment described above is 30 days, the invention is not limited to this. The particular period may be any period. In addition, the movement image rendering unit 23 in the embodiment described above is not limited to the configuration for creating secondary-mesh probe data. The movement image rendering unit 23 may create probe data adapted to primary meshes, tertiary meshes, or meshes expressed in other units.

The map information converter 24 converts map information from a vector form to a scalar form. In particular, the map information converter 24 removes, from among the map information in a vector form stored in the map information storage 21, the following types of information associated with map image information: node information, link information, and attribute information indicating whether a road is an ordinary road or an expressway. In other words, the map information converter 24 retrieves only map image information indicating a road shape. By maintaining map image information alone, the map information converter 24 converts map information from a three-dimensional vector form to a two-dimensional scalar form. Accordingly, only map image information is obtained by removing node information, link information, and attribute information from the map information in a three-dimensional vector form. Only map image information is obtained from the map information in a three-dimensional vector form, i.e., the map information is converted into map information in a two-dimensional scalar form, which is simple in data configuration. Thus, the map information processing device 2 may convert each of map information and a movement track image obtained from probe data into data in the same simple dimension, thereby facilitating the difference extraction process performed by the difference extractor 25, which will be described hereinafter. The map information converter 24 arranges the two-dimensional map information in a scalar form obtained as a result of the conversion, in a manner such that this map information in a scalar form is divided into meshes of an arbitrary scaling factor.

The embodiment described above is not limited to a configuration in which the map information converter 24 divides two-dimensional map information in a scalar form obtained as a result of conversion into meshes of an arbitrary scaling factor. For example, when the road shape change determination unit 26 decides from difference data that the possibility of a road shape having changed is less than or equal to a specified likelihood, the map information converter 24 may convert pieces of map information with a high scaling factor from among the map information stored in the map information storage 21 from a vector form to a scalar form.

Accordingly, the map information processing device 2 may roughly determine the whole in an initial stage so that a decision can be made faster as to whether a road shape has changed. In other words, when it has been decided from difference data that the possibility of a road shape having changed is less than or equal to a specified likelihood, the map information processing device 2 can set map information with a higher scaling factor as an object to be processed, thereby enhancing the processing speed owing to the limited processing object. As a result, the map information processing device 2 can improve the determination accuracy.

The difference extractor 25 is configured to be capable of extracting difference data by comparing a movement track image rendered by the movement image rendering unit 23 with a map image different from the movement track image that is included in map information converted into information in a scalar form by the map information converter 24.

For example, the map information storage 21 and data storage 29 of the map information processing device 2 in accordance with the present embodiment may be configured with a hard disk drive or a semiconductor memory. The memory may store a program for driving a central processing unit (CPU). The CPU is configured to be capable of causing the movement image rendering unit 23, the map information converter 24, the difference extractor 25, the road shape change determination unit 26, and the map information updating unit 27 to function in accordance with the program stored in the memory being executed. The vehicle data receiver 28 may be configured with an appropriate communication module.

By referring to FIGS. 5A-5D, the following describes an example of the process of extracting difference data by means of the difference extractor 25.

Figure 5A:
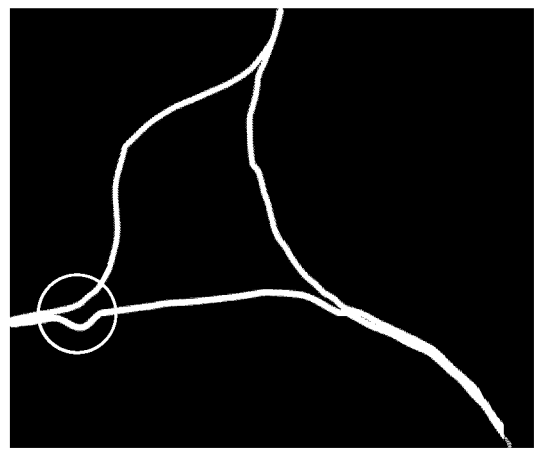
FIG. 5A illustrates an example of a method for extracting difference data from a movement track image and a map image by means of a difference extractor.
Figure 5B:
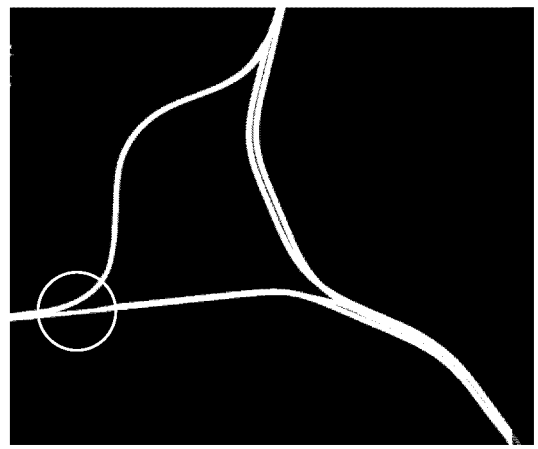
FIG. 5B illustrates an example of a method for extracting difference data from a movement track image and a map image by means of a difference extractor.
Figure 5C:
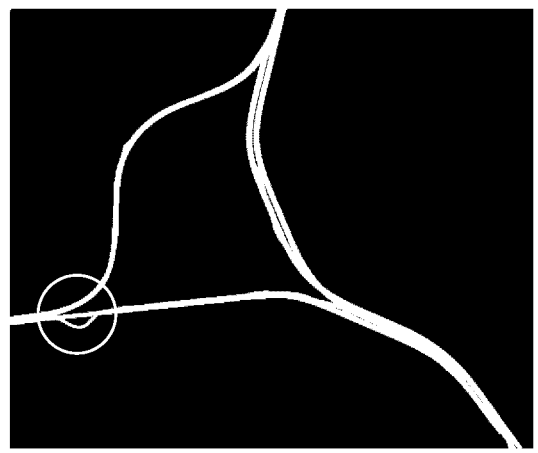
FIG. 5C illustrates an example of a method for extracting difference data from a movement track image and a map image by means of a difference extractor.
Figure 5D:
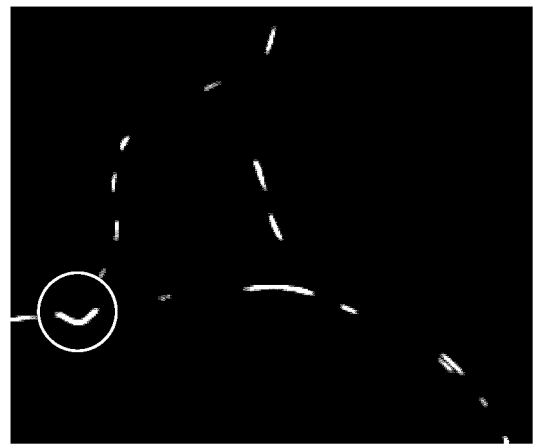
FIG. 5D illustrates an example of a method for extracting difference data from a movement track image and a map image by means of a difference extractor.

The difference extractor 25 acquires a movement track image rendered by the movement image rendering unit 23 and a map image included in map information converted into information in a scaler form by the map information converter 24. FIG. 5A exemplifies a movement track image rendered by the movement image rendering unit 23. FIG. 5B exemplifies a map image included in map information converted into information in a scaler form. As depicted in FIG. 5C, the difference extractor 25 creates an image of composite data obtained by compositing the acquired movement track image and map image. As depicted in FIG. 5D, the difference extractor 25 forms an image of difference data by removing the overlaps of the movement track image depicted in FIG. 5A and the map image depicted in FIG. 5B from the image of composite data. Accordingly, fluctuations in the movement tracks in the movement track image can be eliminated to extract an image only for movement tracks that are not seen in the map image. FIG. 5D exemplifies an image of difference data extracted by the difference extractor 25. The image of difference data is considered to indicate the difference between the road at the time of generation of the map information and the current road. Thus, the image of difference data is considered to indicate a road shape change. In the example depicted in FIGS. 5A-5D, a new road could have been formed in the region surrounded by a circle. The map information processing device 2 decides whether the extracted difference data, including the portion surrounded by the circle in each of FIGS. 5A-5D, corresponds to a road shape change.

The road shape change determination unit 26 decides through machine learning whether the difference data extracted by the difference extractor 25 corresponds to a road shape change. Deep learning is used for the machine learning. In particular, the road shape change determination unit 26 performs the machine learning with difference data extracted in the past being defined as teacher data. The road shape change determination unit 26 decides on the basis of a result of the machine learning whether the newly extracted difference data corresponds to a road shape change. The machine learning in the present application is not limited to processes in which a computer performs data-based iterative learning so as to detect a specified pattern for prediction, but is interpreted in a broad sense, thereby covering a data mining process that includes detecting data characteristics that had been unknown up to that moment.

Figure 6:
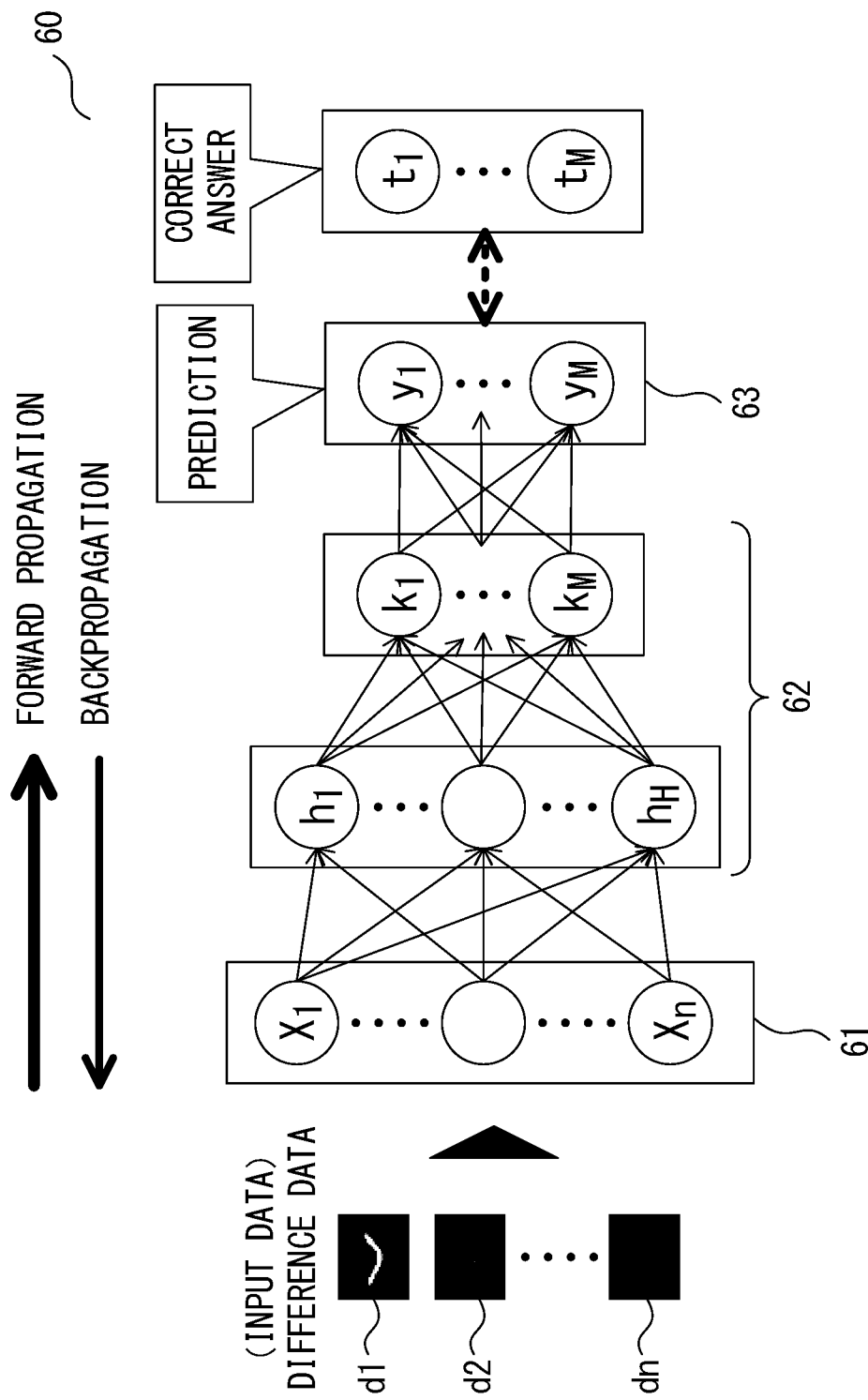
FIG. 6 illustrates an example of a method for determining a road shape change through machine learning.

By referring to FIG. 6, descriptions will be given of an example of a method wherein the road shape change determination unit 26 determines a road shape change through deep learning. Deep learning is a type of technique for machine learning based on a multi-layer neural network 60. In the neural network 60, input data and output data are provided, and internal arithmetic processing is performed on the basis of a plurality of artificial neurons. The neural network 60 used for machine learning includes three layers. The three layers are an input layer 61, an intermediate layer 62, and an output layer 63, which are depicted in FIG. 6. The intermediate layer 62, which is also referred to as a hidden layer, may include two or more layers. The intermediate layer 62 having excessively few layers means insufficient learning. The intermediate layer 62 having excessively many layers means excessive adaptation. The number of layers may be set as appropriate for the road shape change determination unit 26 to decide whether difference data corresponds to a road shape change. The artificial neurons output the sum of outputs of a previous layer multiplied by a parameter. Output data of the artificial neurons is made non-linear by being controlled according to an activating function. For example, the activating function for machine learning used in the present embodiment may be a softmax function, a sigmoid function, or a Gaussian function.

In the neural network 60, first, the input layer 61 is supplied with teacher data as input data for machine learning. For example, the teacher data may be difference data extracted in the past by the difference extractor 25. The road shape change determination unit 26 processes the teacher data by means of the input layer 61, the intermediate layer 62, and the output layer 63. In particular, the road shape change determination unit 26 performs a forward propagation process in which a feature amount optimum for the input difference data is dynamically generated and learned and arithmetic processing is performed via forward information propagation. FIG. 6 depicts the direction of forward propagation by using an extra-thick arrow. The output result indicates a prediction result as to whether the input difference data corresponds to noise or an image with a road shape change.

When the learning is performed, the road shape change determination unit 26 performs a backpropagation process in which arithmetic processing is performed via backward information propagation by providing information as to whether the output result corresponds to noise or an image with a road shape change. FIG. 6 depicts the direction of backpropagation by using a thick arrow. The road shape change determination unit 26 evaluates, in machine learning, an output error between output data and input data used as teacher data for learning. Through the backpropagation process, the road shape change determination unit 26 preferably successively optimizes parameters for layers and nodes for machine learning on the basis of output errors.

Through this learning process, the road shape change determination unit 26 can gradually optimize parameters for the individual layers. When difference data extracted by the difference extractor 25 is input to the input layer 61, the road shape change determination unit 26 may decide, by using the parameter adjusted on the basis of a result of the machine learning, whether the difference data corresponds to an image with a road shape change.

For example, as depicted in FIG. 6, when the road shape change determination unit 26 forwardly propagates n pieces of difference data d1, d2, . . . dn as teacher data, the output layer 63 may be supplied with information on M pieces of output data y1 to yM. In the present embodiment, the output data indicates a predictive value as to whether input difference data is an image with a road shape change or is another image.

The road shape change determination unit 26 is provided with information on M pieces of correct-answer data t-1 to tM indicating whether the pieces of acquired output data y1 to yM correspond to noise or an image with a road shape change. When backpropagation is performed upon receipt of the information on correct-answer data t1 to tM, the road shape change determination unit 26 successively performs machine learning for adjusting and setting an optimum value as a parameter. In other words, the road shape change determination unit 26 evaluates the difference between output data and correct-answer data via backpropagation so as to optimize the parameter. Software to be used for the machine learning may be, for example, OpenCV, Numpy, Matplotlib, or Chainer.

The map information updating unit 27 updates map information stored in the map information storage 21. In particular, the map information updating unit 27 generates map information in a vector form from map information converted into a scalar form that corresponds to difference data that the road shape change determination unit 26 has determined corresponds to a road shape change. The map information updating unit 27 updates the map information stored in the map information storage 21 by using the generated map information. The process of updating map information will be described by referring to the map information updating process described hereinafter.

In the meantime, the map information processing device may simply identify a road shape change from probe data and a digital map through machine learning.

As a general rule, however, digital map data is three-dimensional vector data that includes, for example, map image information indicating a road shape and the following types of information associated with the map image information: information on nodes or links on a map image and attribute information indicating whether a road is an ordinary road or an expressway.

Accordingly, in a case where a change in a newly created road shape is detected through machine learning, if information processing is simply performed with a digital map in a three-dimensional vector form as an object to be processed through machine learning, the information amount of the object to be processed could become excessively large, thereby imposing an excessively large load on the map information processing device for information processing. In addition, due to large information amounts of objects to be compared in machine learning, the map information processing device may have a difficulty in determining which pieces of information are to be compared.

The map information processing device 2 in accordance with the present embodiment creates a road map through machine learning, and hence objects to be processed are made as simple as possible so that a road shape change can be easily determined.

The shape of the earth is not spherical but oblate, and hence there may be differences between the vertical and horizontal lengths of the meshes depending locations. When the map information processing device 2 in accordance with the present embodiment performs machine learning, normalization is preferably performed in advance such that the meshes become equal in vertical and horizontal lengths. After performing machine learning, the map information processing device 2 may undo the normalization of the meshes so as to more accurately determine road shape changes.

Figure 7:
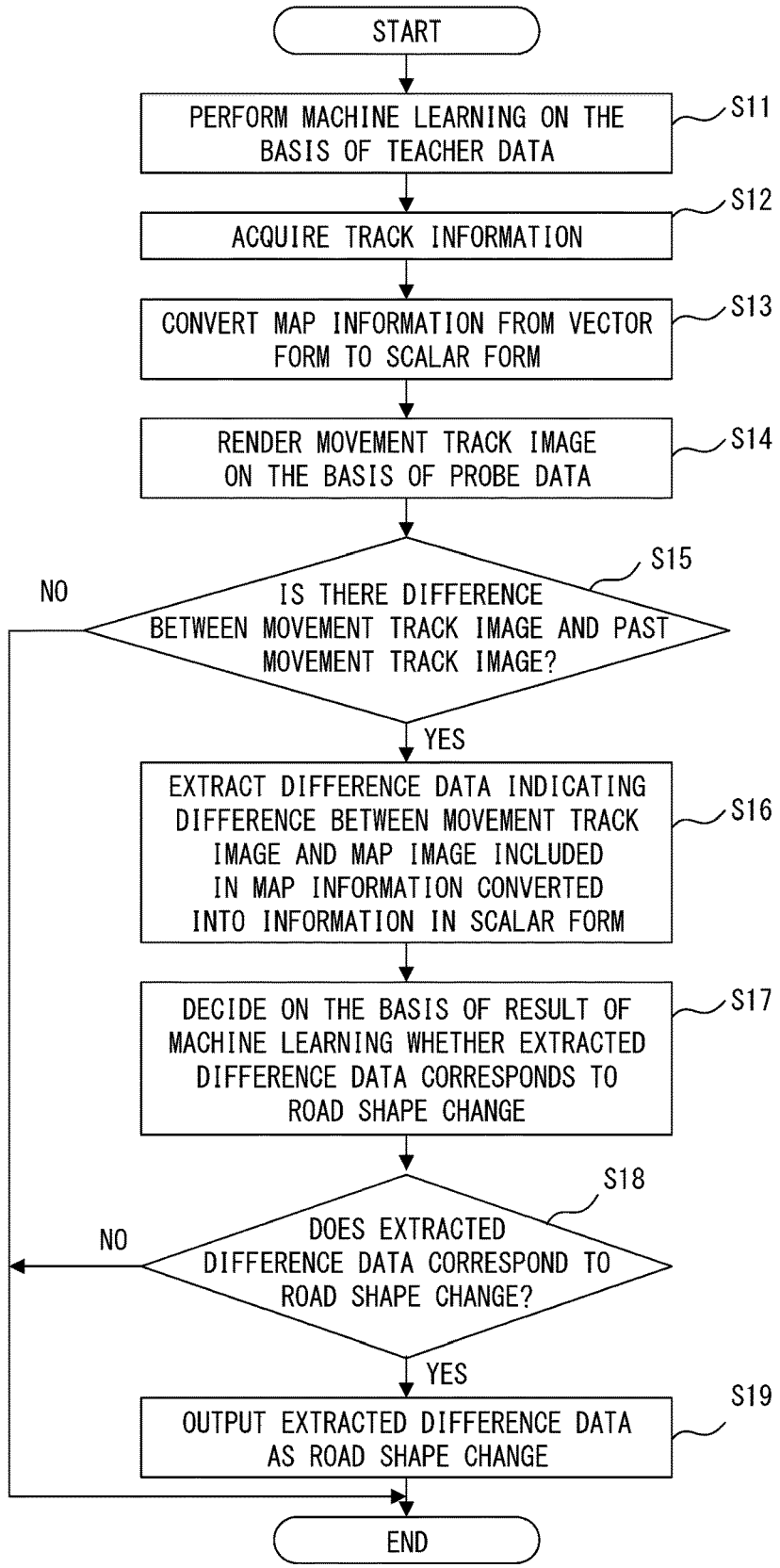
FIG. 7 is a flowchart illustrating an example of a road shape change determination process based on a road shape change determination process program in accordance with a first embodiment.
Figure 8:
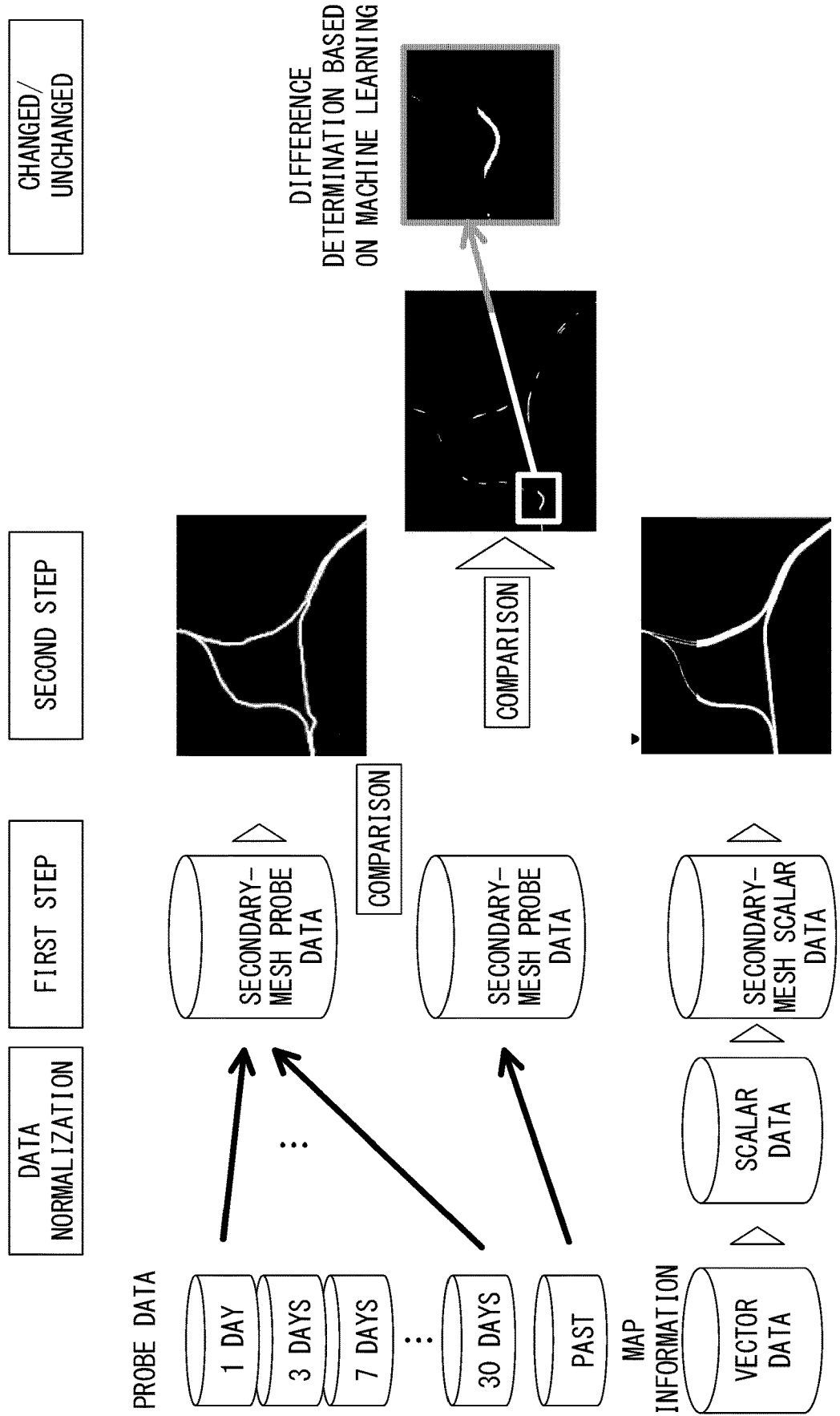
FIG. 8 illustrates an example of a road shape change determination process in accordance with a first embodiment.

By referring to FIGS. 7 and 8, the following describes the road shape change determination process performed by the map information processing device 2 in accordance with the present embodiment. Upon receipt of an instruction to start the road shape change determination process, the map information processing device 2 starts the determination process of steps 11 to 19 depicted in FIG. 7. A "step" will hereinafter be represented as "S".

Before deciding whether there is a road shape change, the map information processing device 2 optimizes a parameter on the basis of teacher data. The road shape change determination unit 26 performs machine learning on the basis of the teacher data (S11).

Information prepared in advance as the teacher data is input to the road shape change determination unit 26. The information prepared in advance is used to set a parameter for identifying whether difference data extracted in the past is an image indicating a road shape change or an image with noise or the like. For example, the set parameter may be held by the road shape change determination unit 26 or stored in a memory that the road shape change determination unit 26 is capable of accessing.

Next, the vehicle data receiver 28 of the track information acquisition unit 22 receives probe data transmitted from vehicle-installed terminals 3. The track information acquisition unit 22 stores the received probe data in the data storage 29. Accordingly, the track information acquisition unit 22 acquires track information of the vehicles 4 included in the received probe data (S12).

The map information converter 24 retrieves map image information indicating road shapes from map information in a vector form stored in the map information storage 21. The map information converter 24 converts the map information from a three-dimensional vector from to a two-dimensional scalar form by retrieving the map image information (S13).

In other words, the map information converter 24 converts the map information in a vector form into a map image in a raster form. In the present embodiment, the map information converter 24 converts two-dimensional map information in a scalar form into scalar data of secondary meshes of an arbitrary scaling factor. The movement image rendering unit 23 creates secondary-mesh probe data by normalizing data obtained by accumulating probe data acquired by the track information acquisition unit 22 for a specified unit period.

The movement image rendering unit 23 renders a movement track image of secondary meshes on the basis of the secondary-mesh probe data obtained from the normalization (S14).

Before creating a movement track image on the basis of probe data acquired for the specified period, the movement image rendering unit 23 performs data normalization by accumulating past probe data acquired by the track information acquisition unit 22 for a particular period. The movement image rendering unit 23 creates past secondary-mesh probe data based on the normalized data. The movement image rendering unit 23 renders a past movement track image of secondary meshes on the basis of the normalized past secondary-mesh probe data. The past movement track image of secondary meshes is used as a reference.

In a first step, the movement image rendering unit 23 decides, through a comparison, whether there is a difference between the movement track image of secondary meshes rendered on the basis of the secondary-mesh probe data and the past movement track image of secondary meshes rendered on the basis of the secondary-mesh past probe data (S15).

Although the movement image rendering unit 23 in the embodiment described above renders a movement track image of secondary meshes, the invention is not limited to this. The movement image rendering unit 23 may render a movement track image of meshes of an arbitrary scaling factor, such as primary meshes or tertiary meshes. The movement image rendering unit 23 is not limited to deciding, through a comparison, whether there is a difference between a movement track image of secondary meshes and a past movement track image of secondary meshes. For example, the movement image rendering unit 23 may directly compare information on latitudes and longitudes included in secondary-mesh probe data with information on latitudes and longitudes included in past secondary-mesh probe data so as to decide whether there is a difference between the images.

When there are no differences between the movement track image and the past movement track image (NO in S15), the map information processing device 2 skips S16 to S19 depicted in FIG. 7, and the road shape change determination process ends. Thus, only when a difference is detected in the decision in S15, the map information processing device 2 performs S16 to S17. Accordingly, the map information processing device 2 may perform S17 at a decreased frequency. The map information processing device 2 may set, as an object for which the difference-data extraction process is to be performed by the difference extractor 25, only a movement track image for which a difference from a movement track image created on the basis of probe data accumulated in the past has been detected. Hence, the map information processing device 2 can decrease the number of objects to be processed by the difference extractor 25, thereby reducing the processing load and enhancing the processing speed.

When there is a difference between the movement track image and the past movement track image (YES in S15), the difference extractor 25 extracts difference data indicating the difference between the movement track image rendered in S14 and the map image included in the map information converted into information in a scalar form in S13 (S16).

The road shape change determination unit 26 decides on the basis of the result of machine learning in S11 whether the difference data newly extracted in S16 corresponds to a road shape change (S17).

When the extracted difference data corresponds to a road shape change (YES in S18), the road shape change determination unit 26 outputs the extracted difference data as a road shape change (S19).

In this case, the difference data, which indicates a road shape change, is stored for use in a later process for creating map information.

When the extracted difference data does not correspond to a road shape change (NO in S18), S19 is skipped, and the road shape change determination process ends. In this case, the difference data is not information indicating a road shape change but is highly likely to be simple noise. Hence, the extracted difference data may be discarded.

As described above, the map information processing device 2 retrieves only map image information indicating a road shape from among the map information in a vector form stored in the map information storage 21. Thus, the map information in a three-dimensional vector form is converted into map information in a two-dimensional scalar form having a simple data configuration. Accordingly, the map information processing device 2 may convert each of map information and a movement track image obtained from probe data into data in the same simple dimension.

As a result, when detecting a change in a newly created road shape through machine learning, the map information processing device 2 may decrease objects to be processed through machine learning, thereby reducing the processing load. The map information processing device 2 can enhance the processing speed and improve the determination accuracy, thereby facilitating the determination of a road shape change.

Figure 10A:
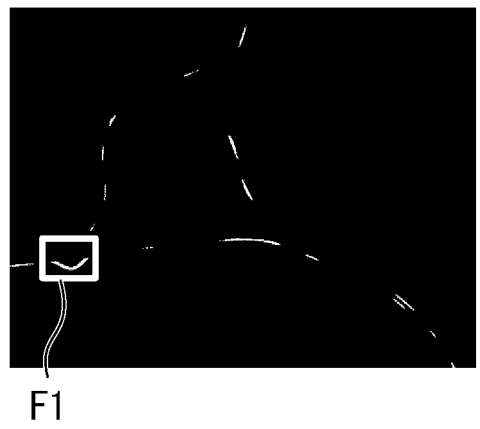
FIG. 10A illustrates an example of a map information updating process.
Figure 10B:
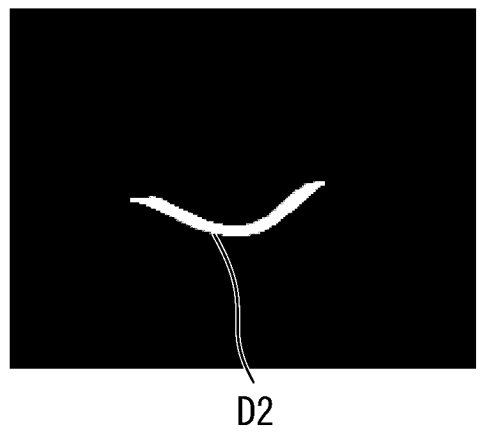
FIG. 10B illustrates an example of a map information updating process.

The following describes the map information updating process performed by the map information processing device 2 in accordance with the present embodiment by referring to FIGS. 9, 10A, and 10B.

The map information processing device 2 starts the map information updating process, which will be described in the following, upon receipt of an instruction to such an effect. Although the map information updating process in the embodiment described above is started upon receipt of an instruction to start such a process, the invention is not limited to this. For example, the map information updating process may automatically start when a specified number of road shape changes have been output in the above-described road shape change determination process in S19.

First, the map information updating unit 27 accumulates N pieces of difference data output in the road shape change determination process in S19 and averages errors in probe data (S31), where N is an arbitrary natural number. FIGS. 10A and 10B exemplify the probe data for which errors have been averaged. FIG. 10B is an enlarged view of a region F1 in FIG. 10A. The map information updating unit 27 performs a smoothing process for difference data for which errors have been averaged, i.e., data indicating road shapes determined as road shape changes (S32). The road shapes for which the smoothing process has been performed correspond to the shapes of newly built roads.

The map information updating unit 27 acquires map information of meshes that include latitudes and longitudes for the road shapes for which the smoothing process has been performed in S32 from among the map information in a vector form stored in the map information storage 21. Road shapes determined on the basis of difference data are shapes created on the basis of probe data and thus include latitude and longitude information. Accordingly, the map information updating unit 27 can acquire map information of corresponding meshes from the map information storage 21 by referring to latitudes and longitudes included in the probe data of road shapes.

Figure 10C:
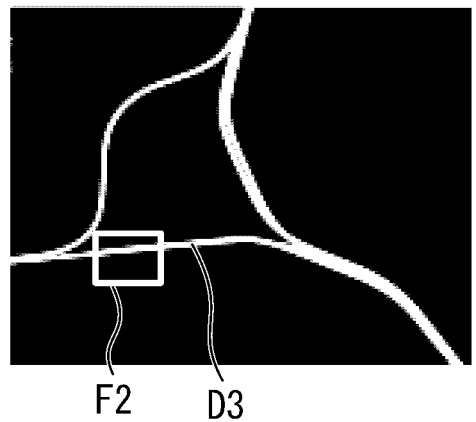
FIG. 10C illustrates an example of a map information updating process.
Figure 10D:
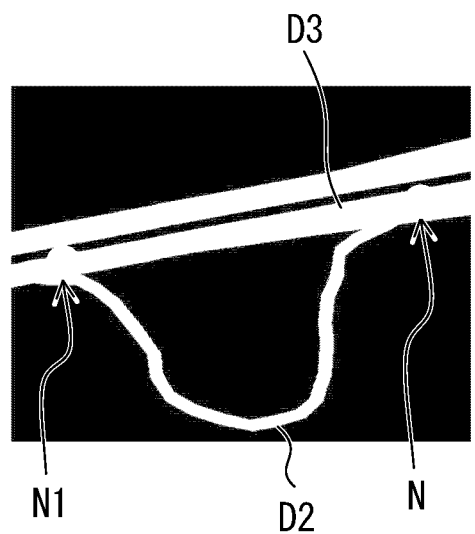
FIG. 10D illustrates an example of a map information updating process.

As depicted in FIGS. 10C and 10D, the map information updating unit 27 overlays a two-dimensional road shape D2, i.e., a two-dimensional road shape for which the smoothing process has been performed in S32, on a road shape D3, i.e., a road shape included in the acquired map information of meshes in a vector form (S33). FIG. 10D is an enlarged view of a region F2 in FIG. 10C.

Figure 10E:
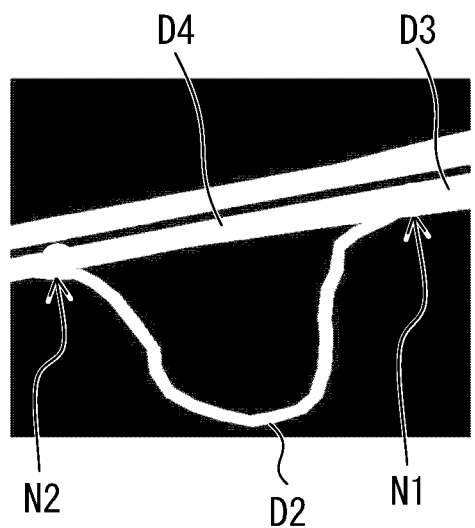
FIG. 10E illustrates an example of a map information updating process.

As depicted in FIG. 10D, the map information updating unit 27 determines points of contact between the two-dimensional road shape D2, i.e., a two-dimensional road shape for which the smoothing process has been performed in S32, and the road shape D3, i.e., a road shape included in the map information of meshes in a vector form. In this example, the map information is represented in a vector form and thus Includes information in a Z-axis direction. The Z-axis direction is perpendicular to the ground. Thus, the map information includes information indicating a Z-axis coordinate for each road. For example, a Z-axis coordinate may be an altitude. Accordingly, points of contact between a road shape D2 generated from difference data and a road in map information are represented by latitudes, longitudes, and altitudes. The map information updating unit 27 adds nodes to the determined contacts (S34). FIGS. 10D and 10E exemplify nodes N1 and N2. Nodes added to a road shape D2 generated from difference data include, for each road, information on contacts indicating a Z-axis direction, and accordingly the road shape D2 is converted into a shape in a vector form.

The map information updating unit 27 generates an axis for the road shape D2 in a vector form by using the determined nodes (S35).

The map information updating unit 27 modifies the road width of the road shape D2 obtained from the difference data in a manner such that this road width becomes equal to the road width of the road shape D3 included in the map information. The road shape D2 in a vector form for which the road width has been modified is linked to the road shape D3 included in the map information by using nodes (S36).

The map information updating unit 27 deletes the added nodes and a road portion D4 that has become unnecessary from the road shape D3 included in the map information (S37). For example, the map information updating unit 27 may delete, as a road portion D4 that has become unnecessary, a portion which is situated between nodes added to an original two-dimensional road shape D2 before conversion and for which probe data is not present.

The map information updating unit 27 deletes the road portion D4 that has become unnecessary. The map information updating unit 27 updates the map information in the map information storage 21 on the basis of the road shape D3 to which the road shape D2 in a vector form is linked (S38). Finishing this process is equivalent to finishing the map information updating process.

Accordingly, map information can be updated by converting two-dimensional difference data extracted as a road shape change back into three-dimensional vector data. As a result, map information can be periodically automatically formatted, thereby lessening troubles with update of the map information.

The map information processing device 2 in accordance with the first embodiment includes a controller, a temporary storage, a storage, and a radio communication unit. The controller runs a program read into the storage. The control unit of the map information processing device 2 includes the vehicle data receiver 28, movement image rendering unit 23, map information converter 24, difference extractor 25, road shape change determination unit 26, and map information updating unit 27 in accordance with the first embodiment. The storage of the map information processing device 2 includes the map information storage 21 and data storage 29 in accordance with the first embodiment. The temporary storage is a working area into which a program or various data read from the storage is loaded. Components such as the controller, the temporary storage, the storage, and the radio communication unit are connected to each other.

For example, the map information processing device 2 in accordance with the first embodiment may be used as a technique for automatically formatting map data to be used in a car navigation system or an automatic driving assistance system.

The map information processing method in accordance with the first embodiment acquires track information for each of a plurality of moving bodies. The map information processing method converts map information that includes information indicating the position and shape of a road from a vector form to a scalar form. The map information processing method extracts difference data indicating the difference between a movement track image rendered from the track information and the map image included in the map information covered into information in a scalar form. In the map information processing method, a computer performs a process of deciding through machine learning whether the difference data corresponds to a road shape change.

The map information processing program in accordance with the present embodiment acquires track information for each of a plurality of moving bodies. The map information processing program converts map information that includes information indicating the position and shape of a road from a vector form to a scalar form. The map information processing program extracts difference data indicating the difference between a movement track image rendered from the track information and the map image included in the map information covered into information in a scalar form. The map information processing program causes a computer to perform a process of deciding through machine learning whether the difference data corresponds to a road shape change.

Second Embodiment

The following describes another embodiment of the invention. The map information processing device in accordance with the second embodiment is different from the map information processing device 2 in accordance with the first embodiment mainly in that in the second embodiment, difference data is extracted through a comparison with a past movement track image. The map information processing device in accordance with the second embodiment may hereinafter be referred to as a map information processing device 2B so as to distinguish from the configuration of the map information processing device 2 in accordance with the first embodiment. The map information processing device 2B in accordance with the second embodiment will be described by referring to FIG. 11.

Descriptions of components of the map information processing device 2B in accordance with the second embodiment that are similar to those in the first embodiment will be omitted as appropriate.

As depicted in FIG. 11, the map information processing device 2B in accordance with the second embodiment includes two movement image rendering units 23, a map information updating unit 27, a movement data generator 30, a movement data storage 31, and a movement data extractor 32 in addition to the map information storage 21, the track information acquisition unit 22, the difference extractor 25, and the road shape change determination unit 26. One of the two movement image rendering units 23 may hereinafter be referred to as a first movement image rendering unit 231, and the other may hereinafter be referred to as a second movement image rendering unit 232. The two movement image rendering units 23 are the same in configuration but each have different data input thereto. The map information processing device 2 does not necessarily include two movement image rendering units 23 but may include only a single movement image rendering unit 23 as long as pieces of data input thereto are sequentially changed. The movement data generator 30 preferably includes a time measurement unit for time measurement. The movement data extractor 32 preferably includes a time measurement unit for time measurement.

The following describes an example in which the movement image rendering units 23 render a movement track image of a vehicle 4. The first movement image rendering unit 231 from among the movement image rendering units 23 acquires track information included in a plurality of pieces of probe data from the data storage 29 of the track information acquisition unit 22 by means of the movement data generator 30. The movement data generator 30 removes information unnecessary for rendering a movement track image from the plurality of pieces of acquired probe data. For example, the movement data generator 30 may generate, from the plurality of pieces of probe data, data only on a set of coordinates each obtained at a certain time point and indicated by a latitude and a longitude. For example, the movement data generator 30 may generate, from the plurality of pieces of probe data, data only on a set of normalized coordinates obtained by normalizing variations in the coordinates. The movement data generator 30 is not necessarily separated from the movement image rendering units 23 but may be included in the movement image rendering units 23. The movement data generator 30 may be included in the track information acquisition unit 22. Similarly, the movement image rendering units 23 may be included in the track information acquisition unit 22. In particular, on the basis of information on a set of coordinates included in track information, the movement image rendering units 23 acquire a group of m consecutive pieces of probe data, as in the example depicted in FIG. 4A in accordance with the first embodiment. The movement image rendering units 23 plot the obtained coordinates as points P1, P2, P3 . . . Pm. The movement image rendering units 23 render a single movement track image L by linking the plotted points P1, P2, P3 . . . Pm with a line, as in the example depicted in FIG. 4B in accordance with the first embodiment. Accordingly, the movement image rendering units 23 in accordance with the second embodiment may generate a movement track image in a scalar form from vector probe data that includes information on time, travel distance, travel speed, acceleration, angular velocity, vehicle orientation, and slope angle in addition to track information. Pieces of data only on sets of coordinates indicated by latitudes and longitudes that are generated by the movement data generator 30 are accumulated in the movement data storage 31 together with time information.

The movement image rendering units 23 in accordance with the second embodiment use past probe data as a reference. Track information based on past probe data is stored in the movement data storage 31. First, the movement data extractor 32 extracts past track information to be used as a reference from the movement data storage 31. The movement data extractor 32 may extract past specified track information from a particular period set in advance. Past track information to be used as a reference is input from the movement data storage 31 to the second movement image rendering unit 232 from among the movement image rendering units 23. The movement image rendering units 23 render a movement track image from track information created from secondary-mesh probe data created on the basis of track information acquired by the first movement image rendering unit 231 for a specified unit period and renders a past movement track image to be used as a reference on the basis of past track information accumulated in advance over a particular period by the second movement image rendering unit 232. Past track information is preferably created for each mesh. For example, thirty days may be set in advance for the movement image rendering units 23 as the particular period for past probe data. So that all past probe data can be addressed, the movement image rendering units 23 may use all probe data as the particular period. In the present embodiment, the movement image rendering units 23 create, as past probe data, track information of secondary meshes accumulated for 30 days.

The difference extractor 25 in accordance with the second embodiment is configured to be capable of extracting difference data by comparing secondary-mesh probe data newly created by the first movement image rendering unit 231 with secondary-mesh probe data created in the past by the second movement image rendering unit 232. The difference extractor 25 is separated from the first movement image rendering unit 231 and the second movement image rendering unit 232 but may be included in the movement image rendering units 23.

Although the specified unit period in the second embodiment is 1 day, 3 days, 7 days, or 30 days, the invention is not limited to this. The specified unit period may be not only a period expressed on a daily basis but also any period such as one expressed on an hourly, monthly, or yearly basis. Although the particular period in the embodiment described above is 30 days, the invention is not limited to this. The particular period may be any period. In addition, the movement image rendering units 23 in the embodiment described above are not limited to the configuration for creating secondary-mesh probe data. The movement image rendering units 23 may create probe data adapted to primary meshes, tertiary meshes, or other unit meshes.

In other words, the difference extractor 25 in accordance with the second embodiment is configured to be capable of extracting difference data for a movement track image in a scalar form rendered by the first movement image rendering unit 231 on the basis of vector probe data acquired for a specified period and a movement track image in a scalar form rendered in the past by the second movement image rendering unit 232 on the basis of vector probe data acquired in advance for a particular period, i.e., a movement track image rendered before the first movement image rendering unit 231 renders the movement track image. The specified period and the particular period may be set as appropriate.

For example, the map information storage 21, data storage 29, and movement data storage 31 of the map information processing device 2 in accordance with the second embodiment may be configured with a hard disk drive or a semiconductor memory. The memory may store a program for driving a CPU. The CPU is configured to be capable of causing the first movement image rendering unit 231, the second movement image rendering unit 232, the difference extractor 25, the road shape change determination unit 26, the map information updating unit 27, the movement data generator 30, and the movement data extractor 32 to function in accordance with the program stored in the memory being executed. The vehicle data receiver 28 may be configured with an appropriate communication module.

By referring to FIGS. 12A-12D, the following describes an example of the process of extracting difference data by means of the difference extractor 25 in accordance with the second embodiment.

Figure 12C:
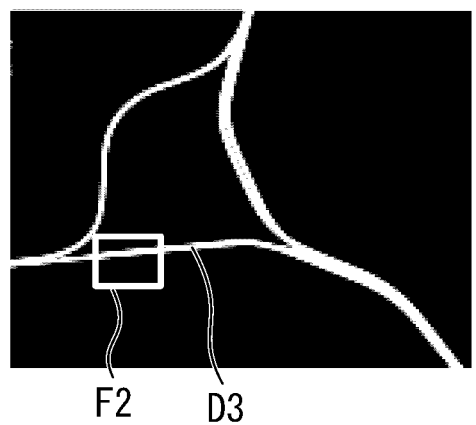
FIG. 12C illustrates an example of a method for extracting difference data from a movement track image and a past movement track image by means of a difference extractor in accordance with a second embodiment.
Figure 12D:
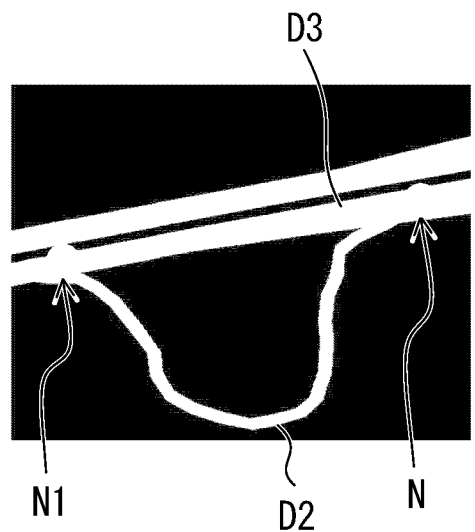
FIG. 12D illustrates an example of a method for extracting difference data from a movement track image and a past movement track image by means of a difference extractor in accordance with a second embodiment.

The difference extractor 25 in accordance with the second embodiment acquires a movement track image rendered by the first movement image rendering unit 231 and a past movement track image rendered by the second movement image rendering unit 232. FIG. 12A exemplifies a movement track image rendered by the first movement image rendering unit 231. FIG. 12B exemplifies a past movement track image rendered by the second movement image rendering unit 232. As depicted in FIG. 12C, the difference extractor 25 creates an image of composite data obtained by compositing an acquired movement track image and an acquired past movement track image. As depicted in FIG. 12D, the difference extractor 25 forms an image of difference data by removing the overlaps of the movement track image depicted in FIG. 12A and the past movement track image depicted in FIG. 12B from the image of composite data. FIG. 12D exemplifies an image of difference data extracted by the difference extractor 25. The image of difference data is considered to indicate the difference between the road at the time of generation of the map information and the current road. Thus, the image of difference data is considered to indicate a road shape change. In the example depicted in FIGS. 12A-12D, a new road could have been formed in the region surrounded by a rectangle. The map information processing device 2 decides whether the extracted difference data, including the portion surrounded by the rectangle in each of FIGS. 12A-12D, corresponds to a road shape change.

The map information updating unit 27 updates map information stored in the map information storage 21. In particular, the map information updating unit 27 generates map information of vector data from movement track information that corresponds to difference data that the road shape change determination unit 26 has determined corresponds to a road shape change. The map information updating unit 27 updates the map information stored in the map information storage 21 by using the generated map information.

The map information processing device 2 in accordance with the second embodiment may identify track information through machine learning after deleting, from probe data, data necessary for generation of a movement track image.

Figure 13:
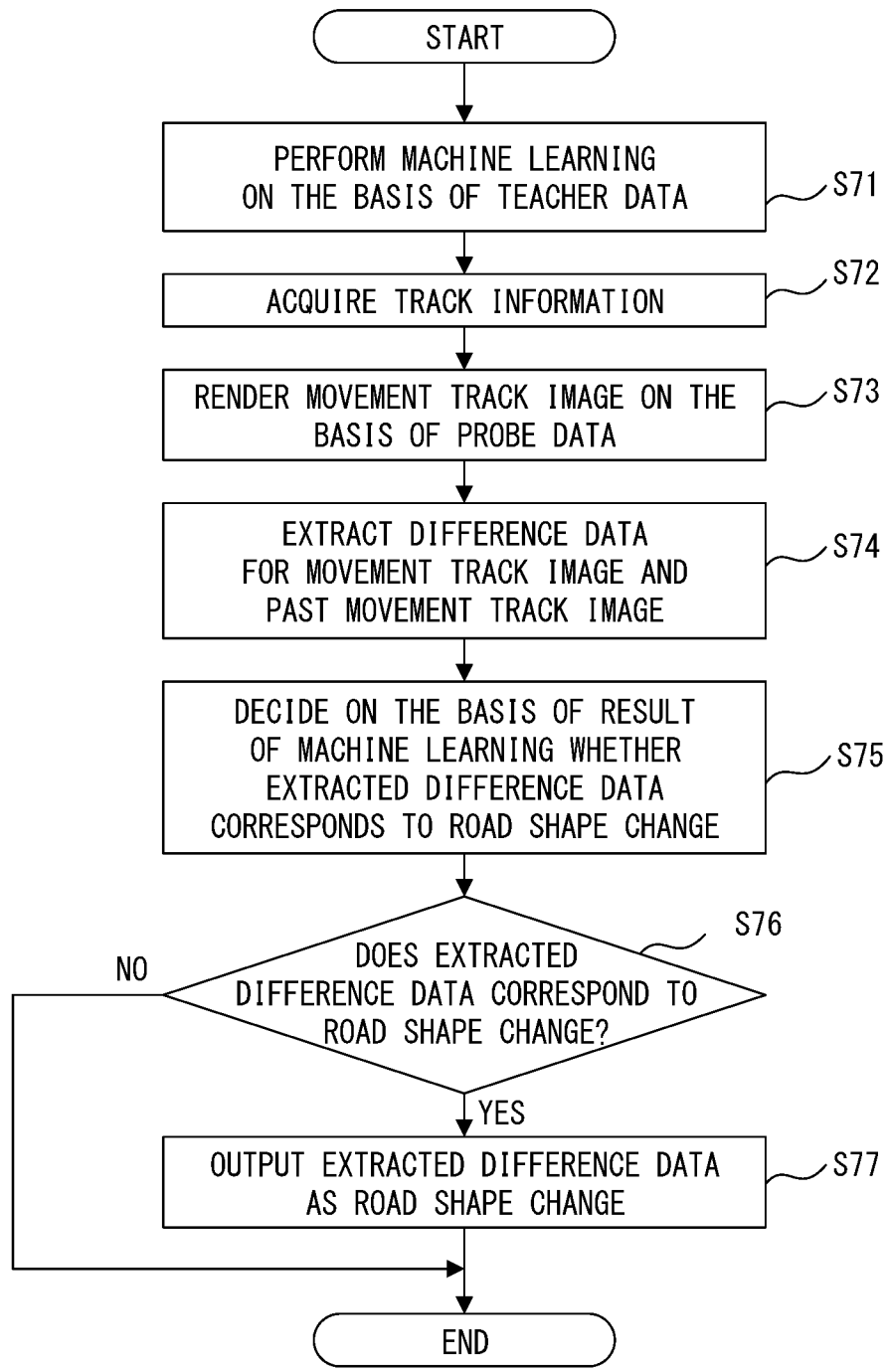
FIG. 13 is a flowchart illustrating an example of a road shape change determination process based on a road shape change determination process program in accordance with a second embodiment.

By referring to FIGS. 13 and 14, the following describes the road shape change determination process performed by the map information processing device 2 in accordance with the second embodiment. Upon receipt of an instruction to start the road shape change determination process, the map information processing device 2 starts the determination process of steps 71 to 77 depicted in FIG. 13. The processes of steps 71, 72, 75, 76, and 77 in FIG. 13 in accordance with the second embodiment are essentially the same as those of steps 11, 12, 17, 18, and 19 in FIG. 7 in accordance with the first embodiment, and descriptions thereof are omitted herein.

The movement data generator 30 creates secondary-mesh probe data by normalizing data obtained by accumulating probe data acquired by the track information acquisition unit 22 for a specified unit period. The movement data generator 30 deletes data unnecessary for rendering a movement image from the vector probe data. The unnecessary data includes, for example, travel distance, travel speed, acceleration, angular velocity, vehicle orientation, and slope angle.

The first movement image rendering unit 231 renders a movement track image of secondary meshes by using normalized track information of secondary meshes (S73). In other words, the first movement image rendering unit 231 creates a movement track image by using probe data acquired for a specified unit period.

The second movement image rendering unit 232 renders a past movement track image of secondary meshes by using past track information of secondary meshes extracted by the movement data extractor 32 from the movement data storage 31. The past movement track image of secondary meshes is used as a reference.

The movement image rendering unit 23 extracts difference data by comparing a movement track image of secondary meshes rendered by the first movement image rendering unit 231 on the basis of secondary-mesh probe data with a past movement track image of secondary meshes rendered by the second movement image rendering unit 232 on the basis of past secondary-mesh probe data (S74).

Accordingly, the map information processing device 2 in accordance with the second embodiment can detect a road shape change without using map information.

As a result, the map information processing device 2 can enhance the processing speed and improve the determination accuracy, thereby facilitating the determination of a road shape change.

The map information processing device 2 in accordance with the second embodiment includes a controller, a temporary storage, a storage, and a radio communication unit. The controller runs a program read into the storage. The control unit of the map information processing device 2 includes the vehicle data receiver 28, movement image rendering units 23, difference extractor 25, road shape change determination unit 26, map information updating unit 27, movement data generator 30, and movement data extractor 32 in accordance with the second embodiment. The storage of the map information processing device 2 includes the map information storage 21, data storage 29, and movement data storage 31 in accordance with the second embodiment. The temporary storage is a working area into which a program or various data read from the storage is loaded. Components such as the controller, the temporary storage, the storage, and the radio communication unit are connected to each other.

The map information processing method in accordance with the second embodiment acquires probe data for each of a plurality of moving bodies. The map information processing method generates a movement track image in a scalar form on the basis of vector probe data acquired for a specified period for each of a plurality of moving bodies. The map information processing method generates a past movement track image in a scalar form on the basis of vector probe data acquired in advance for a particular period for each of a plurality of moving bodies. The map information processing method extracts difference data indicating the difference between the movement track image and the past movement track image. In the map information processing method, a computer performs a process of deciding through machine learning whether the difference data corresponds to a road shape change.

The map information processing program in accordance with the present embodiment acquires probe data for each of a plurality of moving bodies. The map information processing program generates a movement track image in a scalar form on the basis of vector probe data acquired for a specified period for each of a plurality of moving bodies. The map information processing program generates a past movement track image in a scalar form on the basis of vector probe data acquired in advance for a particular period for each of a plurality of moving bodies. The map information processing program extracts difference data indicating the difference between the movement track image and the past movement track image. The map information processing program causes a computer to perform a process of deciding through machine learning whether the difference data corresponds to a road shape change.

The present invention is not simply limited to the embodiments described herein. Components of the embodiments may be varied in an implementation phase without departing from the gist of the invention. A plurality of components disclosed with reference to the described embodiments may be combined, as appropriate, to achieve various inventions. For example, all of the components indicated with reference to embodiments may be combined as appropriate. In addition, components of different embodiments may be combined as appropriate. Accordingly, various variations and applications can be provided, as a matter of fact, without departing from the gist of the invention.

What is claimed is:

1. A map information processing device comprising
a processor configured
to acquire probe data for each of a plurality of moving bodies;
to generate a movement track image in a scalar form on the basis of vector probe data acquired for each of the plurality of moving bodies;
to convert map information that includes information indicating a position and shape of a road from a vector form to a scalar form;
to extract difference data indicating a difference between the movement track image and a map image included in the map information converted into a scalar form; and
to decide through machine learning whether the difference data corresponds to a road shape change.

2. The map information processing device according to claim 1, further comprising
a map information storage that stores the map information that includes information indicating a position and shape of a road, the map information being represented in a vector form.

3. The map information processing device according to claim 1, wherein
the processor renders the movement track image on the basis of probe data of each of the plurality of moving bodies, and
the processor collectively renders movement track images located within a specified range.

4. The map information processing device according to claim 3, wherein
the processor renders a past movement track image on the basis of probe data acquired for a particular period, then renders a movement track image on the basis of probe data acquired for a specified period, and finally decides, through a comparison, whether there is a difference between the rendered movement track image and the rendered past movement track image, and
the processor sets, as an object for which a difference-data extraction process is to be performed, only a movement track image for which it has been decided through a comparison that there is a difference from the past movement track image.

5. The map information processing device according to claim 1, wherein
the processor retrieves only map image information indicating a road shape from among the map information and converts the retrieved map image from a vector form to a scalar form.

6. The map information processing device according to claim 1, wherein
the processor performs machine learning in accordance with difference data extracted in the past and decides on the basis of a result of the machine learning whether newly extracted difference data corresponds to a road shape change.

7. The map information processing device according to claim 2, wherein
the processor that updates map information stored in the map information storage,
the processor
converts difference data that the road shape change determination unit determines corresponds to a road shape change into vector data, and
updates map information stored in the map information storage by using the difference data converted into vector data.

8. The map information processing device according to claim 2, wherein
for each of a plurality of scaling factors, the map information storage stores map information that includes information indicating positions and shapes of a plurality of roads, and
when the processor decides through the machine learning that the possibility of the difference data corresponding to a road shape change is less than or equal to a specified likelihood, the processor converts pieces of map information with a high scaling factor from among the map information stored in the map information storage from a vector form to a scalar form.

9. A map information processing method wherein a computer performs the processes of:
acquiring probe data for each of a plurality of moving bodies;
generating a movement track image in a scalar form on the basis of vector probe data acquired for each of the plurality of moving bodies;
converting map information that includes information indicating a position and shape of a road from a vector form to a scalar form;
extracting difference data indicating a difference between the movement track image and a map image included in the map information converted into a scalar form; and
deciding through machine learning whether the difference data corresponds to a road shape change.

10. A non-transitory computer-readable recording medium having stored therein a program for causing a computer to execute a processes comprising:
acquiring probe data for each of a plurality of moving bodies;
generating a movement track image in a scalar form on the basis of vector probe data acquired for each of the plurality of moving bodies;
converting map information that includes information indicating a position and shape of a road from a vector form to a scalar form;
extracting difference data indicating a difference between the movement track image and a map image included in the map information converted into a scalar form; and
deciding through machine learning whether the difference data corresponds to a road shape change.

11. A map information processing device, comprising:
a processor configured:
to acquire probe data for each of a plurality of moving bodies;
to generate a movement track image in a scalar form on the basis of vector probe data acquired for a specified period for each of the plurality of moving bodies;
to generate a past movement track image in a scalar form on the basis of vector probe data acquired for a particular period in advance for each of the plurality of moving bodies;
to extract difference data indicating a difference between the movement track image and the past movement track image; and
to decide through machine learning whether the difference data corresponds to a road shape change.

12. The map information processing device according to claim 11, wherein
the processor performs machine learning in accordance with difference data extracted in the past and decides on the basis of a result of the machine learning whether newly extracted difference data corresponds to a road shape change.

13. A map information processing method wherein a computer performs the processes of:
acquiring probe data for each of a plurality of moving bodies;
generating a movement track image in a scalar form on the basis of vector probe data acquired for a specified period for each of the plurality of moving bodies;
generating a past movement track image in a scalar form on the basis of vector probe data acquired for a particular period in advance for each of the plurality of moving bodies;
extracting difference data indicating a difference between the movement track image and the past movement track image; and
deciding through machine learning whether the difference data corresponds to a road shape change.

14. A non-transitory computer-readable recording medium having stored therein a program for causing a computer to execute a processes comprising:
acquiring probe data for each of a plurality of moving bodies;
generating a movement track image in a scalar form on the basis of vector probe data acquired for a specified period for each of the plurality of moving bodies;
generating a past movement track image in a scalar form on the basis of vector probe data acquired for a particular period in advance for each of the plurality of moving bodies;
extracting difference data indicating a difference between the movement track image and the past movement track image; and
deciding through machine learning whether the difference data corresponds to a road shape change.

* * * * *